United States Patent [19]

Hongo

[11] Patent Number: 5,766,077
[45] Date of Patent: Jun. 16, 1998

[54] GAME APPARATUS WITH CONTROLLERS FOR MOVING TOY AND CHARACTER THEREFOR

[75] Inventor: Takeichi Hongo, Tokyo, Japan

[73] Assignee: Kabushiki Kaisha Bandai, Japan

[21] Appl. No.: 672,763

[22] Filed: May 22, 1996

[30] Foreign Application Priority Data

May 26, 1995 [JP] Japan ..................... 7-152191
Apr. 23, 1996 [JP] Japan ..................... 8-126585

[51] Int. Cl.$^6$ ..................... A63F 9/22
[52] U.S. Cl. ..................... 463/30; 273/148 B
[58] Field of Search ............. 463/30, 8, 7; 273/440.1, 273/460, 148 B; 364/410

[56] References Cited

U.S. PATENT DOCUMENTS

| Re. 33,559 | 3/1991 | Fallacaro et al. | 463/30 X |
| 4,729,563 | 3/1988 | Yokoi | 463/30 X |
| 4,995,610 | 2/1991 | Paoletti | 463/8 |
| 5,413,355 | 5/1995 | Gonzalez | 273/460 X |

Primary Examiner—Jessica Harrison
Assistant Examiner—Michael O'Neill
Attorney, Agent, or Firm—Graham & James LLP

[57] ABSTRACT

A highly entertaining game apparatus wherein three-dimensional toy bodies and a game machine are combined and characters corresponding to the toy bodies are displayed on a monitor comprises a game main unit 3, a robot toy 5 connected to the game main unit 3, a monitor 9 for displaying a character corresponding to the robot toy 5, a controller 11 for controlling movements of the character displayed on the monitor 9, a principal robot part (body part 21) of the robot toy 5 and a plurality of robot parts (arm parts 23, 25, leg part 27) removably attached to the principal robot part. The principal robot part has non-volatile memory in which self-related data is stored and each of the robot parts has an identification part for identifying itself. The game main unit 3 has reading-out means (reading-out part 19) for reading out data from the non-volatile memory of the principal robot part and specifying means (reading-out part 19) for decoding the identification part of each of the toy body parts and individually specifying the toy body parts and has controlling means (control part 15) for controlling movements of the character according to the data read out by the data reading-out means and the details specified by the specifying means and manipulation of the controller 11.

4 Claims, 11 Drawing Sheets

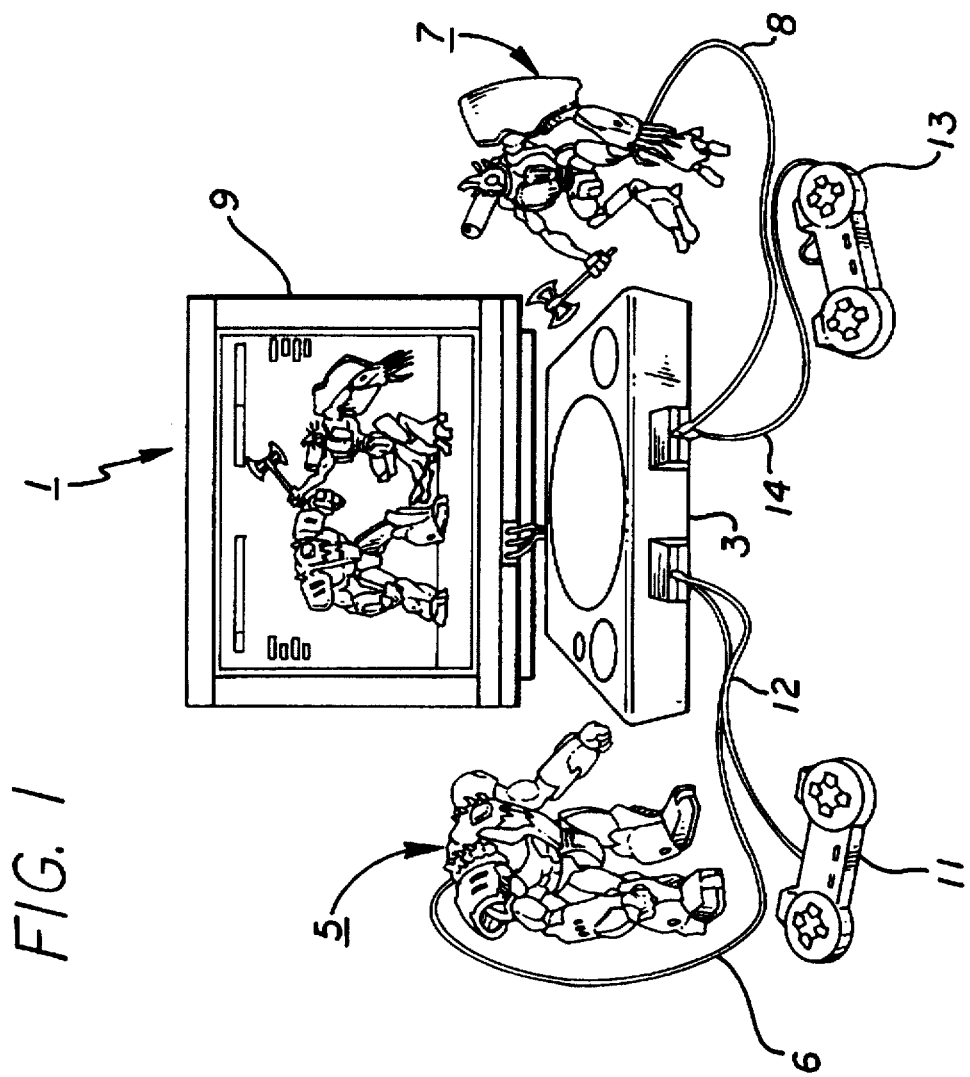
FIG. I

FIG. 11

| BIT / ITEM | 7 | 6 | 5 | 4 | 3 | 2 | 1 | 0 |
|---|---|---|---|---|---|---|---|---|
| UPPER CONTENT | CODE | CODE | CODE | CODE | LEG | RIGHT ARM | LEFT ARM | CODE |
| RANK | 0 | 1 | 0 | 1 | PRESENT /ABSENT | PRESENT /ABSENT | PRESENT /ABSENT | 0 |
| LOWER CONTENT | BODY | BODY | LEG | LEG | RIGHT ARM | RIGHT ARM | LEFT ARM | LEFT ARM |
| RANK | 2 | 1 | 2 | 1 | 2 | 1 | 2 | 1 |

GAME APPARATUS WITH CONTROLLERS FOR MOVING TOY AND CHARACTER THEREFOR

BACKGROUND OF THE INVENTION

1. Field of the Invention

This invention relates to a highly interesting game apparatus which combines three-dimensional toy bodies and a game machine and displays characters corresponding to the toy bodies on a monitor.

2. Description of the related art

Recently, various so-called video game apparatuses which display moving pictures of fighting characters on a monitor and enable fighting games and the like to be played have been proposed. A conventional video game apparatus of this kind has a game main unit in which a game software memory cassette is removably loaded. This game main unit is connected to a monitor and displays moving pictures of various fighting characters on the monitor on the basis of data read out from the memory cassette.

A conventional video game apparatus also has remote controllers; with these remote controllers it is possible to remotely control movements of corresponding characters and proceed with a fighting game with movements of the characters and background pictures sequentially displayed on the monitor.

For example, initial data of attacking power, defending power and vital power of each of the characters fighting is gathered, fights between characters are repeated on the basis of these data, damage suffered by the characters is calculated and when the vital power of one of the characters becomes zero that character is deemed to be the loser.

However, with a conventional video game apparatus, because pictures of fighting robots or the like are just displayed on a monitor, it is not possible to actually touch the robots and to the players they have been distant entities and there has been no sense of intimacy.

SUMMARY OF THE INVENTION

The present invention was devised in view of the above-mentioned problem, and an object of the invention is to provide a game apparatus with which it is possible to control a game with actual toy bodies corresponding to fighting characters displayed on a monitor placed nearby and thereby make it easier for players to empathize with the fighting characters and make the game more interesting.

To achieve the above-mentioned object and other objects, first means provided by the invention is a game apparatus wherein:

(a) there are provided a game main unit, a toy body connected to the game main unit, a monitor for displaying a character corresponding to the toy body and a controller for controlling movements of the character displayed on the monitor;

(b) the toy body has a principal toy body part and a plurality of toy body pans removably attached to the principal toy body part;

(c) the principal toy body part has a non-volatile memory for storing self-related data, (d) each of the toy body parts has an identification part for identifying itself, (e) the game main unit has reading-out means for reading out data from the non-volatile memory of the principal toy body part and specifying means for decoding the identification part of each of the toy body parts and individually specifying the toy body parts; and (f) the game main unit has controlling means for controlling the character displayed on the monitor according to data read out by the reading-out means, details specified by the specifying means and manipulation of the controller.

To achieve the above-mentioned object and other objects, second means provided by the invention is a game apparatus wherein:

(a) there are provided a game main unit, at least a pair of toy bodies connected to the game main unit, a monitor for displaying characters corresponding to the toy bodies and controllers for controlling movements of the characters displayed on the monitor;

(b) each of the toy bodies has a principal toy body part and toy body parts removably attached to the principal toy body part;

(c) each of the principal toy body parts has a non-volatile memory in which self-related data is stored;

(d) the toy body parts include at least a plurality of arm parts and a plurality of leg parts and the plurality of arm parts and the plurality of leg parts are each mutually interchangeable with those of other principal toy body parts;

(e) each of the toy body parts has an identification part for identifying itself;

(f) the game main unit has reading-out means for reading out data from the non-volatile memory of each of the principal toy body parts and specifying means for decoding the identification part of each of the toy body parts and individually specifying the toy body parts attached to each of the principal toy body parts;

(g) the game main unit has controlling means for controlling the characters displayed on the monitor according to data read out by the reading-out means, details specified by the specifying means and manipulation of the controllers; and (h) the game main unit has a memory in which is stored fighting game software for making characters corresponding to the toy bodies appear in a game space and game-developing means for developing the characters in the game space according to the control of the controlling means.

To achieve the above-mentioned object and other objects, third means provided by the invention is a game apparatus wherein:

(a) there are provided a memory removably loaded in a game main unit, a cartridge unit removably connected to the game main unit and a toy body removably connected to the cartridge unit;

(b) game software in which appears a character corresponding to the toy body is stored in the memory;

(c) the toy body has a principal toy body part and toy body parts removably attached to the principal toy body part;

(d) the toy body parts include at least a plurality of arm parts and a plurality of leg parts and the plurality of arm parts and the plurality of leg parts are each mutually interchangeable with those of other principal toy body parts;

(e) each of the toy body parts has an identification part for identifying itself;

(f) the principal toy body part has a non-volatile memory for storing self-related data and data of toy body parts attached to itself; and (g) the cartridge unit has communicating means for gathering data from the non-volatile memory and transferring the gathered data to the game main unit.

To achieve the above-mentioned object and other objects, fourth means provided by the invention is a game apparatus wherein:

(a) there are provided a game main unit, a memory removably loaded in the game main unit, a cartridge unit removably connected to the game main unit, a toy body removably connected to the cartridge unit, a monitor for displaying a character corresponding to the toy body and a controller for controlling movements of the character displayed on the monitor;

(b) the toy body has a principal toy body part and toy body parts removably attached to the principal toy body part;

(c) the toy body parts include at least a plurality of arm parts and a plurality of leg parts and the plurality of arm parts and the plurality of leg parts are each mutually interchangeable with those of other principal toy body parts;

(e) each of the toy body parts has an identification part for identifying itself;

(f) the principal toy body part has a non-volatile memory for storing self-related data and data of toy body parts attached to itself;

(g) the memory stores game software in which appears a character corresponding to the toy body and individual data of the principal toy body part and the toy body parts constituting the toy body;

(h) the memory stores information-gathering software for gathering information from the non-volatile memory; and (i) the game main unit has data reading-in means for on the basis of information gathered by the information-gathering software reading in corresponding data from the memory and game-developing means for according to the data read in by the data reading-in means and manipulation of the controller developing the character in a game space of the game software.

In the first means provided by the invention, a character corresponding to a toy body connected to a game main unit is displayed on a monitor and movements of this character are controlled by means of a controller. The toy body has a principal toy body part and a plurality of different toy body parts removably attached to the principal toy body part, the principal toy body part has a non-volatile memory in which self-related data is stored and each of the toy body parts has an identification part for identifying itself. Also, the game main unit has reading-out means for reading out data from the non-volatile memory of the principal toy body part and specifying means for decoding the identification part of each of the toy body parts and individually specifying the toy body parts and has controlling means for controlling movements of the character displayed on the monitor according to data read out by the reading-out means, details specified by the specifying means and manipulation of the controller, and as a result it is possible to combine a three-dimensional toy body and a game machine and display a character corresponding to the toy body on a monitor and freely control it, and thereby realize a highly interesting game apparatus.

In the second means provided by the invention, characters corresponding to at least a pair of toy bodies connected to a game main unit are displayed on a monitor and movements of each of these displayed characters are controlled by means of respective controllers.

Each of the toy bodies has a principal toy body part and toy body parts removably attached to the principal toy body part, each of the principal toy body parts has a non-volatile memory in which self-related data is stored and each of the principal toy body parts has at least toy body parts constituting arm parts and leg parts and the arm parts and the leg parts are each mutually interchangeable with those of other principal toy body parts.

Each of the toy body parts has an identification part for identifying itself and the game main unit has reading-out means for reading out data from the non-volatile memory of each of the principal toy body parts and specifying means for decoding the identification part of each of the toy body parts and individually specifying the toy body parts attached to each of the principal toy body parts. Also, the game main unit has controlling means for controlling movements of the characters displayed on the monitor according to data read out by the reading-out means, details specified by the specifying means and manipulation of the controllers and has a memory in which is stored fighting game software for making characters corresponding to the toy bodies appear in a game space and game-developing means for developing the characters in the game space according to the control of the controlling means, and as a result it is possible to combine three-dimensional toy bodies and a game machine and make characters corresponding to the toy bodies fight each other, and it is possible to provide a highly entertaining game apparatus with which play can be given a sense of satisfaction and interest.

The third means provided by the invention has a memory removably loaded in a game main unit, a cartridge unit removably connected to the game main unit and a toy body removably connected to the cartridge unit. Game software in which appears a character corresponding to the toy body is stored in the memory. The toy body has a principal toy body part and toy body parts removably attached to the principal toy body part. The toy body parts have identification parts for identifying themselves and include at least a plurality of arm parts and a plurality of leg parts and the plurality of arm parts and the plurality of leg parts are each mutually interchangeable with those of other principal toy body parts. The principal toy body part has a non-volatile memory for storing self-related data and data of toy body parts attached to itself Data of this non-volatile memory is gathered by a cartridge unit and the gathered data is sent to the game main unit by communicating means. A game wherein a corresponding character appears is developed according to this gathered data, and as a result it is possible to combine three-dimensional toy bodies and a game machine and make characters corresponding to the toy bodies fight each other, and it is possible to provide a highly entertaining game apparatus with which play can be given a sense of satisfaction and interest.

The fourth means provided by the invention has a game main unit, a memory removably loaded in the game main unit, a cartridge unit removably connected to the game main unit, a toy body removably connected to the cartridge unit, a monitor for displaying a character corresponding to the toy body and a controller for controlling movements of the character displayed on the monitor. The toy body has a principal toy body part and toy body parts removably attached to the principal toy body part, the toy body parts include at least a plurality of arm parts and a plurality of leg parts and the plurality of arm parts and the plurality of leg parts are each mutually interchangeable with those of other principal toy body parts and each of the toy body parts has an identification part for identifying itself Also, the principal toy body part has a non-volatile memory for storing self-related data and data of toy body parts attached to itself The memory stores game software in which appears a character corresponding to the toy body and individual data of the principal toy body part and the toy body parts constituting the toy body, and stores information-gathering software for gathering information from the non-volatile memory. The game main unit has data reading-in means for on the basis of information gathered by the information-gathering software reading in corresponding data from the memory and game-developing means for according to the data read in by the data reading-in means and manipulation of the controller developing the character in a game space, and as a result it is possible to combine three-dimensional toy bodies and a game machine and make characters corresponding to the toy bodies fight each other, and it is possible to provide a highly entertaining game apparatus with which play can be given a sense of satisfaction and interest.

BRIEF DESCRIPTION OF THE DRAWINGS

FIG. 11 is a view illustrating bits used in data communication in the second preferred embodiment of the invention.

DETAILED DESCRIPTION OF THE PREFERRED EMBODIMENT

A preferred embodiment of the invention will now be described with reference To the accompanying drawings.

Figure 2:
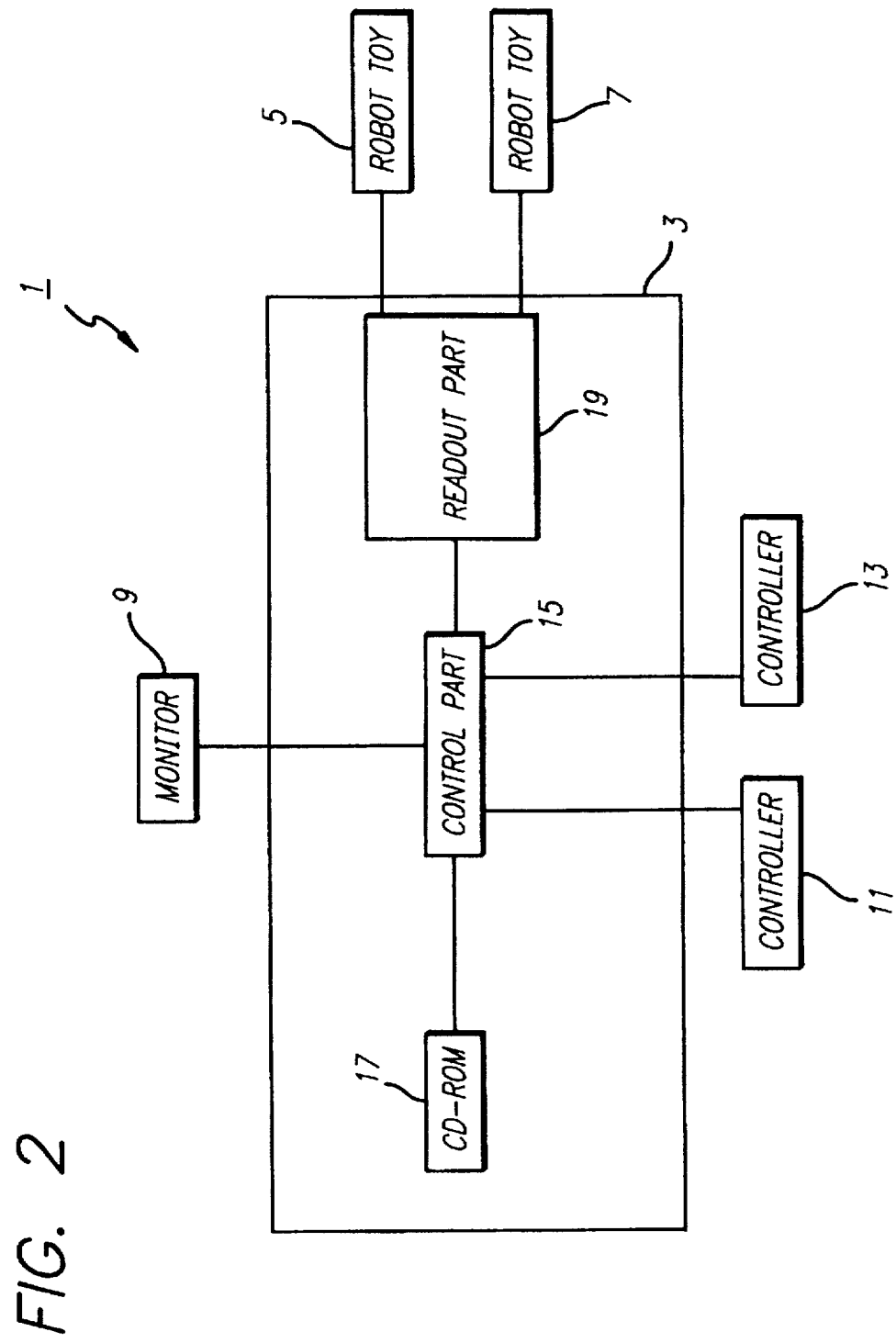
FIG. 2 is a circuit diagram of the first preferred embodiment of the invention.

First, the construction of a game apparatus according to the invention will be described with reference to FIG. 1 and FIG. 2.

A game apparatus 1 according to the invention has a game main unit 3, at least a pair of robot toys 5, 7 which are toy bodies connected to the game main unit 3, a monitor 9 for displaying characters corresponding to the robot toys 5, 7 and controllers 11, 13 for controlling movements of the characters displayed on the monitor 9.

The game main unit 3 is connected by a cable 6 to a principal robot part of the robot toy 5 and by a cable 8 to a principal robot part of the robot toy 7. The game main unit 3 is also connected by a cable 12 to the controller 11 and by a cable 14 to the controller 13. The game main unit 3 is further connected by a plurality of cables to the monitor 9.

The game main unit 3 has a control part 15, a removably loaded CD-ROM 17 and a reading-out part 19. The control part 15 comprises a CPU (microcomputer) and RAM (random access memory), and executes various control processes which will be explained later. The CD-ROM 17 is a memory in which are stored software programs pertaining to fighting games for making characters corresponding to the plurality of robot toys 5, 7 appear on the monitor 9 and making these characters fight. Data on the robot toys 5, 7 and a plurality of robot toys of other types, for example data on external appearance and characteristic features, movement characteristics and weapons used, is also stored in the CD-ROM 17. Also, data on the principal robot parts of the robot toys and data on individual robot parts attached to the principal robot parts are also stored in the CD-ROM 17. Here, principal robot part means principal toy body part and robot part means toy body part.

A non-volatile memory is provided in the principal robot part of each of the robot toys 5, 7. The reading-out part 19 is reading-out means which is connected to the non-volatile memory of each of the robot toys 5, 7 and reads out data from this non-volatile memory.

As the monitor 9, a suitable display device such as a liquid crystal display or a television set is used. The controllers 11, 13 have cross-shaped control switches for making characters corresponding to the robot toys 5, 7 move up and down and sideways or making them advance and retreat and switches for ordering attacks and defenses.

Figure 3:
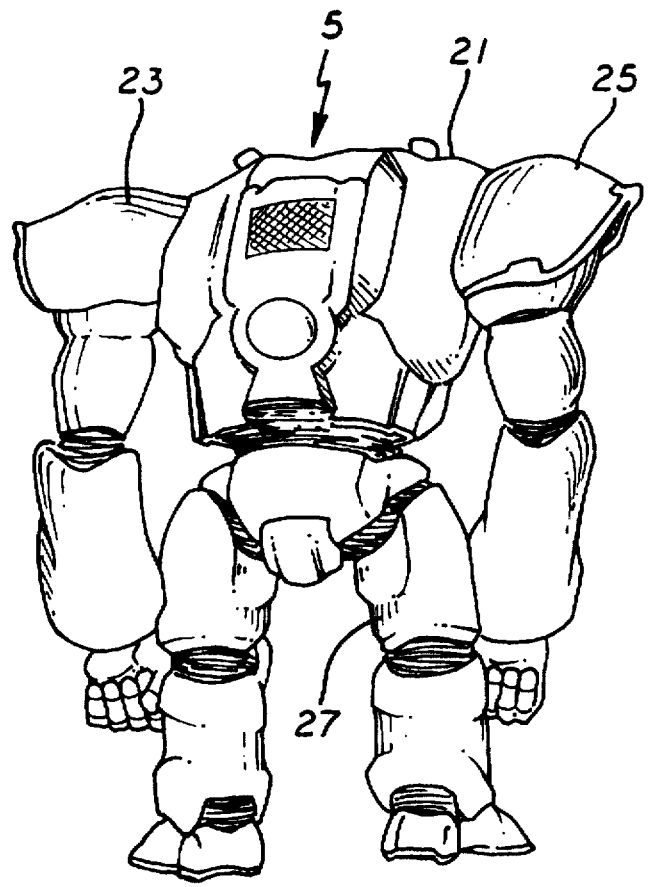
FIG. 3 is a perspective view showing an example of a robot toy used in the first preferred embodiment of the invention.
Figure 4:
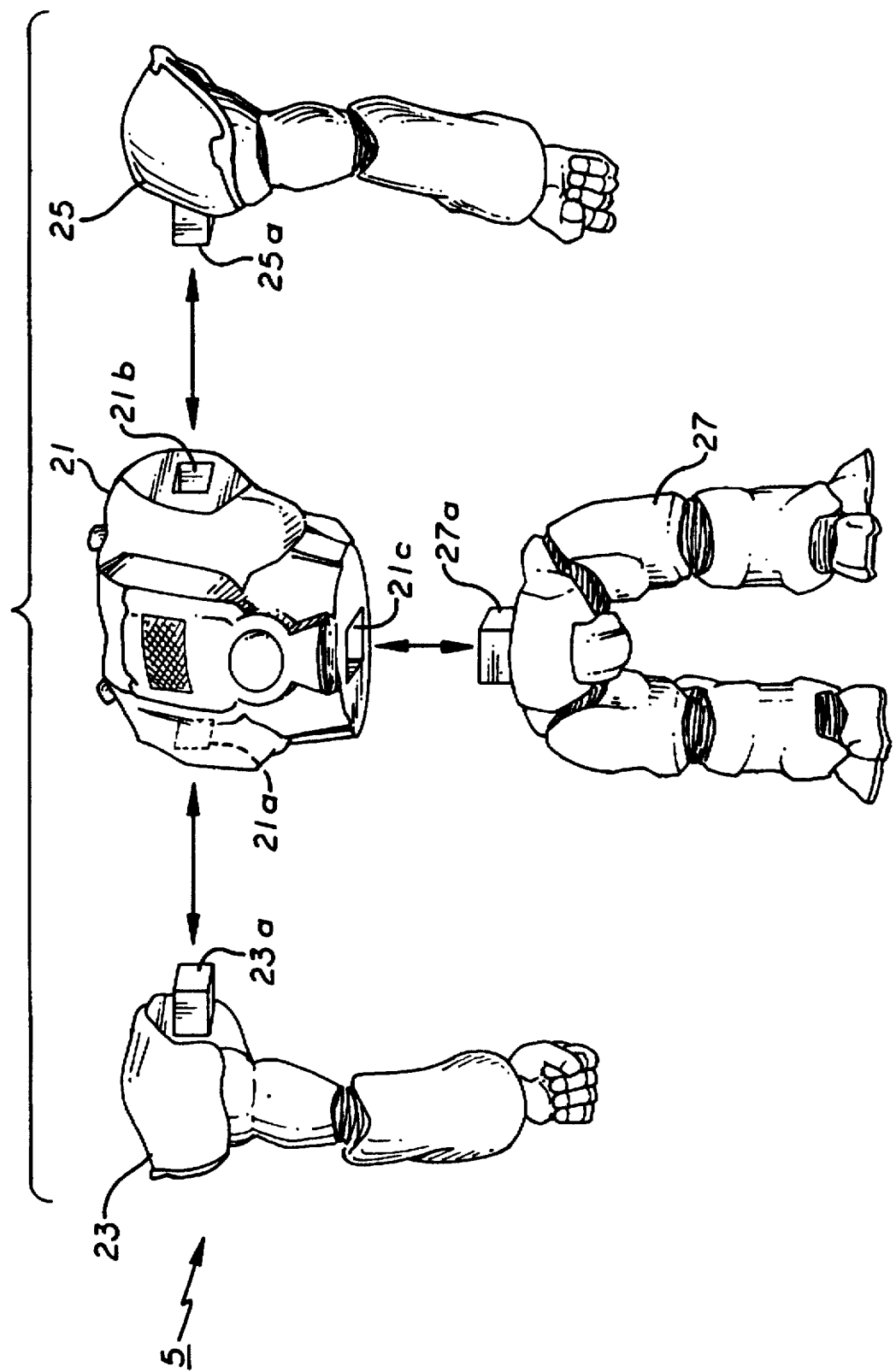
FIG. 4 is an exploded perspective view of the robot toy shown in FIG. 3.

Next, the robot toy 5 will be described with reference to FIG. 3 and FIG. 4. The robot toy 5 is made up of a body part 21 and arm parts 23, 25 and a leg part 27 removably attached to this body part 21, and the exterior of the robot toy 5 is formed in a shape for example like that of a gorilla. The body part 21 is a principal robot part, and the arm parts 23, 25 and the leg part 27 are robot parts removably attached to the principal robot part. The arm parts 23, 25 and the leg part 27 have the characteristic that like a gorilla they are strong but their movements are slow.

The body part 21 has a non-volatile memory in which are stored self-related data such as characteristic features and results of past fights of the robot toy 5, and this non-volatile memory is electrically connected by the cable 6 to the reading-out part 19 of the game main unit 3. The arm parts 23, 25 and the leg part 27, which are robot parts, are mutually interchangeable with those of other principal robot parts, and each of these robot parts has an identification part for identifying itself.

That is a connector 23a is provided on the arm part 23 and a connector receiver 21a mating with the connector 23a is provided in a corresponding position on the body part 21. The number of switches corresponding to the number of plural bits are provided in this connector 23a, and by pre-setting only specified switches unique to this arm part 23 an identification part for identifying the arm part 23 is made.

When the arm part 23 is attached to the body part 21, this identification part consisting of a plurality of switches is electrically connected to the reading-out part 19 of the game main unit 3 by the connector 23a, the connector receiver 21a and the cable 6. As a result, the reading-out part 19 specifies the arm part 23 by detecting the set state of the switches of the identification part.

Similarly, a connector 25a is provided on the arm part 25 and a connector receiver 21b mating with the connector 25a is provided in a corresponding position on the body part 21. The number of switches corresponding to the number of plural bits are provided in this connector 25a, and by pre-setting only specified switches unique to this arm part 25 an identification part for identifying the arm part 25 is made.

When the arm part 25 is attached to the body part 21, this identification part consisting of a plurality of switches is electrically connected to the reading-out part 19 of the game main unit 3 by the connector 25a, the connector receiver 21b and the cable 6. As a result, the reading-out part 19 specifies the arm part 25 by detecting the set state of the switches of the identification part.

Also, a connector 27a is provided on the leg part 27 and a connector receiver 21c mating with the connector 27a is provided in a corresponding position on the body part 21. The number of switches corresponding to the number of plural bits are provided in this connector 27a, and by pre-setting only specified switches unique to this leg part 27 an identification part for identifying the leg part 27 is made.

When the leg part 27 is attached to the body part 21, this identification part consisting of a plurality of switches is electrically connected to the reading-out part 19 of the game main unit 3 by the connector 27a, the connector receiver 21c and the cable 6. As a result, the reading-out part 19 specifies the leg part 27 by detecting the set state of the switches of the identification part.

Figure 5:
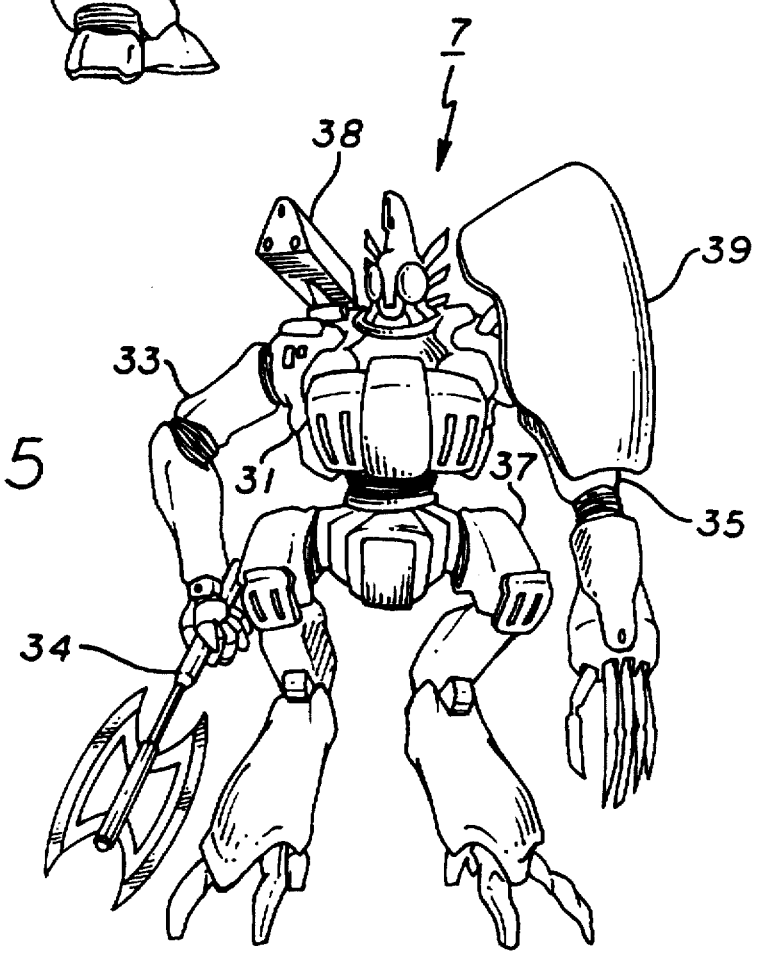
FIG. 5 is a perspective view showing an example of another robot toy used in the first preferred embodiment of the invention.
Figure 6:
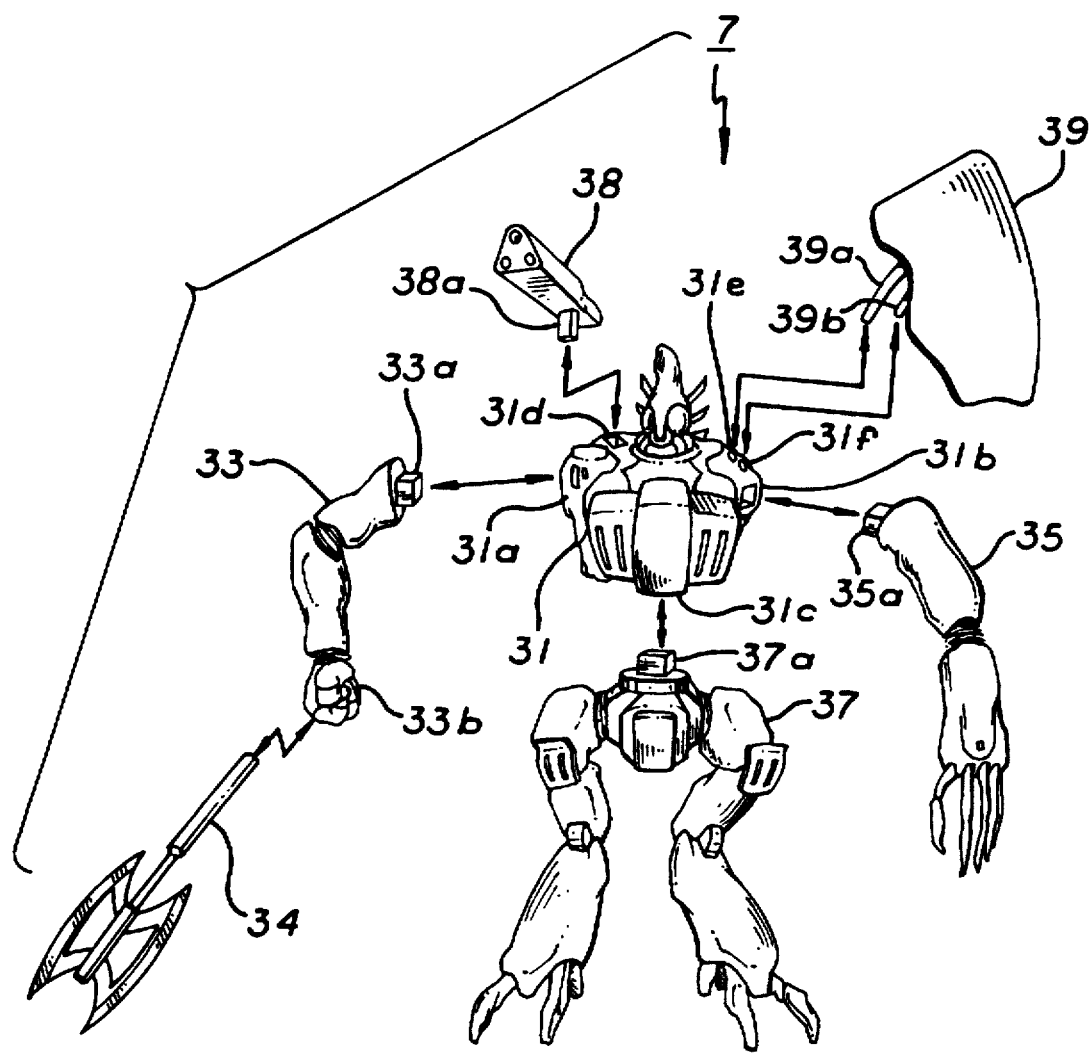
FIG. 6 is an exploded perspective view of the robot toy shown in FIG. 5.

Next, the robot toy 7 will be described with reference to FIG. 5 and FIG. 6. The robot toy 7 is made up of a body part 31 and arm parts 33, 35 and a leg part 37 removably attached to this body part 31, and the exterior of the robot toy 7 is formed in a shape for example like that of a monster. The body part 31 is a principal robot part and the arm parts 33, 35 and the leg part 37 are robot parts removably attached to the principal robot part. The arm parts 33, 35 and the leg part 37 have the characteristic that their movements are fast but their power is weak.

The body part 31 has a non-volatile memory in which are stored self-related data such as characteristic features and results of past fights of the robot toy 7, and this non-volatile memory is electrically connected by the cable 8 to the reading-out part 19 of the game main unit 3. The arm parts 33, 35 and the leg part 37, which are robot parts, are mutually interchangeable with those of other principal robot parts, and each of these robot parts has an identification part for identifying itself.

That is, a connector 33a is provided on the arm part 33 and a connector socket 31a mating with the connector 33a is provided in a corresponding position on the body part 31. The number of switches corresponding to the number of plural bits are provided in this connector 33a, and by pre-setting only specified switches unique to this arm part 33 an identification part for identifying the arm part 33 is made.

When the arm part 33 is attached to the body part 31, this identification part consisting of a plurality of switches is electrically connected to the reading-out part 19 of the game main unit 3 by the connector 33a, the connector socket 31a and the cable 8. As a result, the reading-out part 19 specifies the arm part 33 by detecting the set state of the switches of the identification part.

Similarly, a connector 35a is provided on the arm part 35 and a connector socket 31b mating with the connector 35a is provided in a corresponding position on the body part 31. A number of switches corresponding to a number of bits are provided in this connector 35a, and by pre-setting only specified switches unique to this arm part 35 an identification part for identifying the arm part 35 is made.

When the arm part 35 is attached to the body part 31, this identification part consisting of a plurality of switches is electrically connected to the reading-out part 19 of the game main unit 3 by the connector 35a, the connector socket 31b and the cable 8. As a result, the reading-out part 19 specifies the arm part 35 by detecting the set state of the switches of the identification part.

Also, a connector 37a is provided on the leg part 37 and a connector socket 3c mating with the connector 37a is provided in a corresponding position on the body part 31. The number of switches corresponding to the number of plural bits are provid ed in this connector 37a, and by pre-setting only specified switches unique to this leg part 37 an identification part for identifying the leg part 37 is made.

When the leg part 37 is attached to the body part 31, this identification part consisting of a plurality of switches is electrically connected to the reading-out part 19 of the game main un it 3 by the connector 37a, the connect or socket 31c and the cable 8. As a result, the reading-out part 19 specifies the leg part 37 by detecting the set state of the switches of the identification part.

Various weapons are provided as robot parts removably attached to th e principal robot part. That is, a fitting hole 33b is formed in a fist part of the arm part 33 and a broadax-like weapon 34 is removably fitted in this fitting hole. Also, a fitting hole 31d is formed in a right shoulder part of the body part 31 and a gun-like weapon 38 is removably attached to the body part 31 by a projection 38a of the gun-like weapon 38 being fitted into this fitting hole 31d. Also, fitting holes 31e, 31f are formed in a left shoulder part of the body part 31 and a shield-like weapon 39 is removably attached to the body part 31 by projections 39a, 39b of the shield-like weapon 39 being fitted into these fitting holes 31e, 31f.

Here, because the state of mating of the arm parts 23, 25 with the body part 21 of the robot toy 5 and the state of mating of the arm parts 33, 35 with the body part 31 of the robot toy 7 are the same, the arm parts 23,25,33,35, which are robot parts, are mutually interchangeable with respect to the body parts 21,31, which are principal robot parts. Therefore, the arm parts 23, 25 of the robot toy 5 side can be attached to the body part 31 of the robot toy 7 and reversely the arm parts 33, 35 of the robot toy 7 side can be attached to the body part 21 of the robot toy 5.

Similarly, because the state of mating of the leg part 27 with the body part 21 of the robot toy 5 and the state of mating of the leg part 37 with the body part 31 of the robot toy 7 are the same, the leg parts 27, 37, which are robot parts, are mutually interchangeable with respect to the body parts 21, 31, which are principal robot parts. Therefore, the leg, part 27 of the robot toy 5 side can be attached to the body part 31 of the robot toy 7 side and reversely the leg part 37 of the robot toy 7 side can be attached to the body part 21 of the robot toy 5 side.

Referring again to FIG. 2, the reading-out part 19 is reading-out means for reading out data from the non-volatile memory of the each of the principal robot parts and is also specifying means for decoding the identification parts of each of the robot parts and individually specifying the robot parts attached to each of the principal robot parts.

The control part 15 has controlling means for controlling the movements of respective characters according to the data read out by the reading-out means, the details specified by the specifying means and manipulation of the controllers 11, 13. Also, the control part 15 has game-developing means for developing the respective characters in a fighting game according to the control of the controlling means.

Next, the operation of this preferred embodiment of the invention will be explained.

Figures 1, 10:
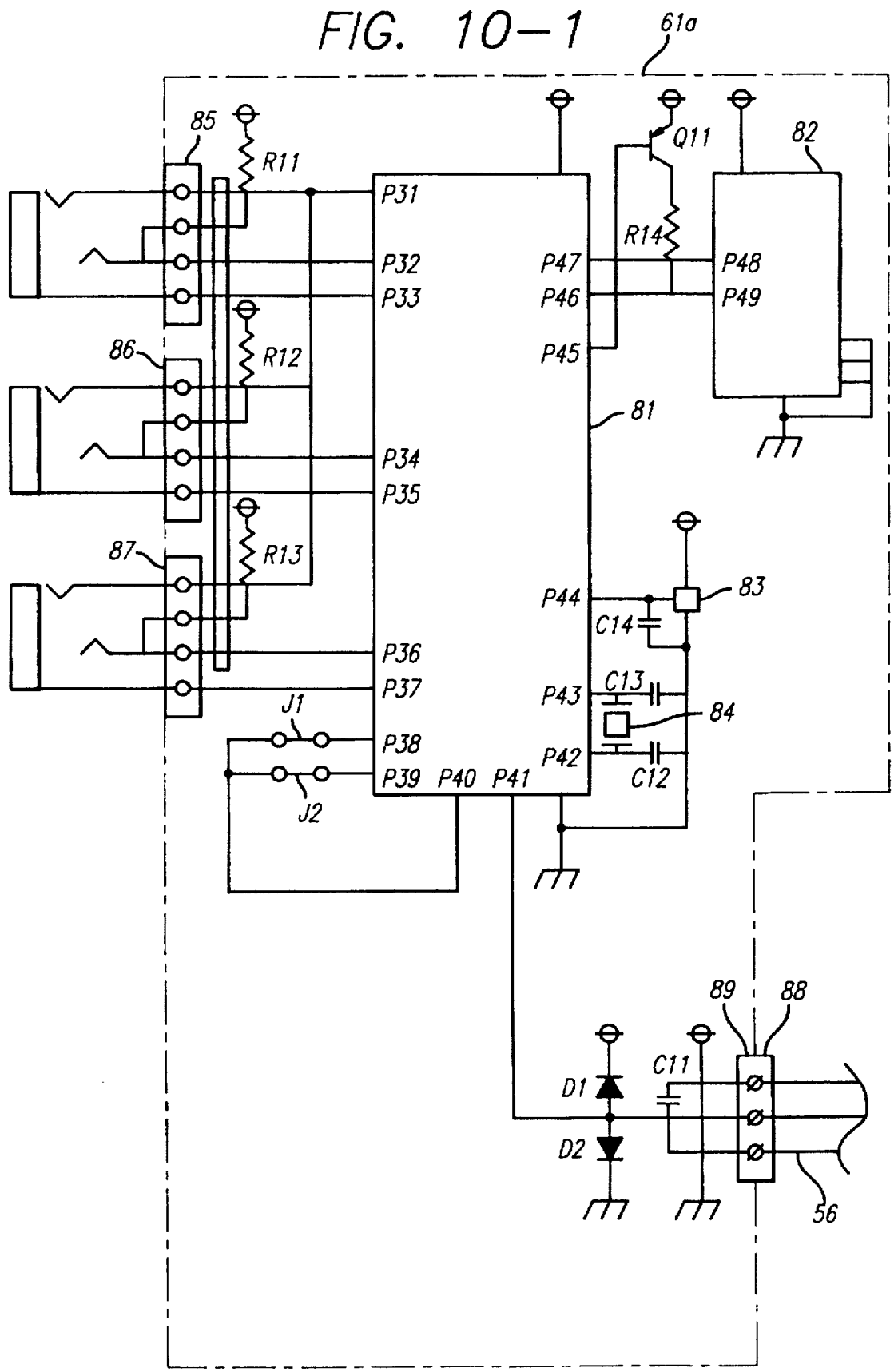
FIG. 1 is an overall construction view of a first preferred embodiment of the invention.
FIG. 10 is a circuit diagram of a main part of the second preferred embodiment of the invention.
Figures 2, 10:
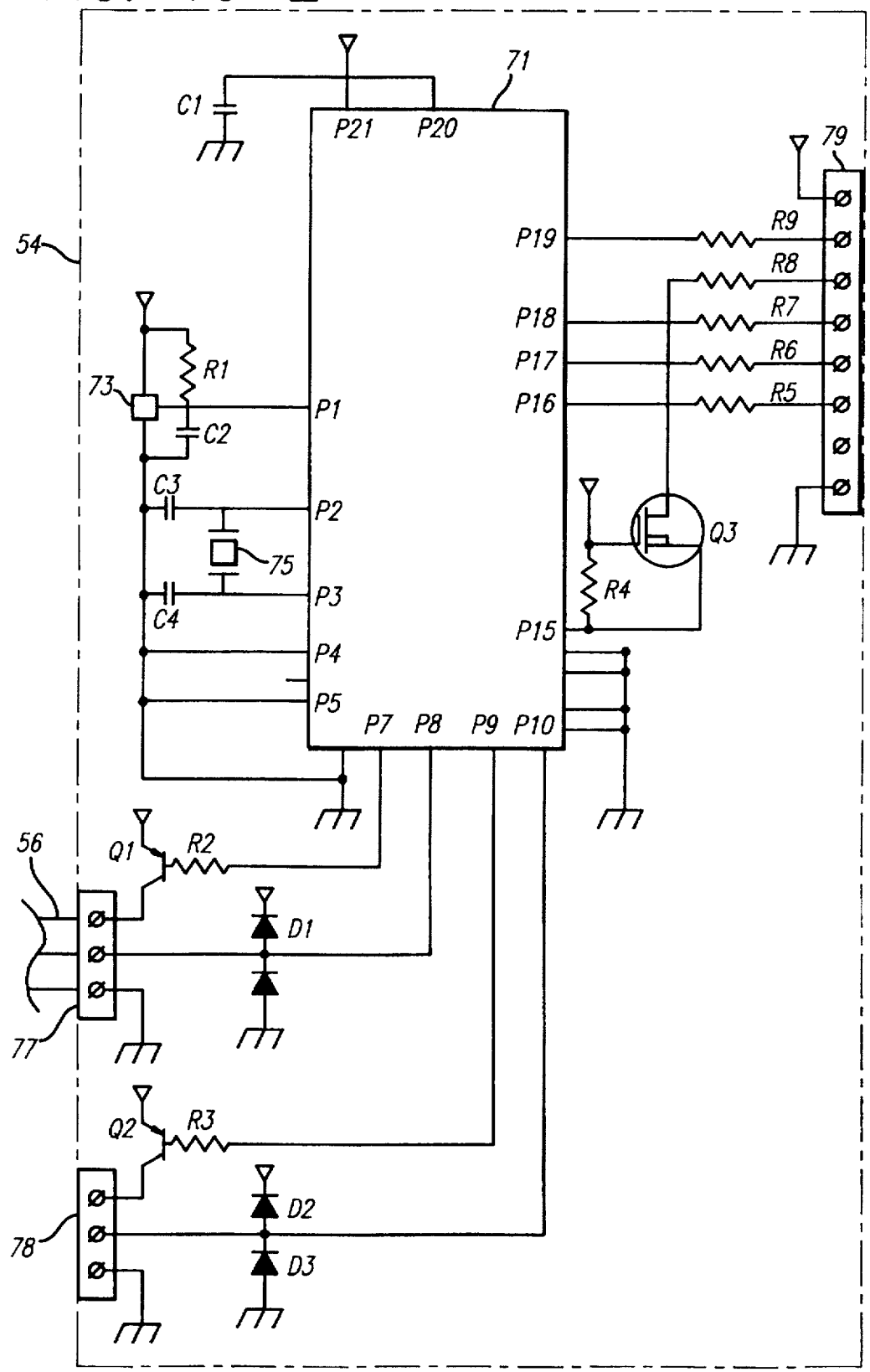

When the robot toy 5 is connected to the game main unit 3 as shown in FIG. 1, the reading-out part 19 reads out characteristic data and past fight data and so on of the robot toy 5 from the non-volatile memory of the body part 21 and individually specifies the arm parts 23, 25 attached to the body part 21 by decoding the set states of the switches of the identification parts provided in the connectors 23a, 25a.

When the robot toy 7 is connected to the game main unit 3, the reading-out part 19 reads out characteristic data and past fight data and so on of the robot toy 7 from the non-volatile memory of the body part 31 and individually specifies the arm parts 33, 35 attached to the body part 31 by decoding the set states of the switches of the identification parts provided in the connectors 33a, 35a.

The various information from the reading-out part 19 is output to the control part 15. This control part 15 reads out program information pertaining to fighting games, character data of the robot toys 5, 7 and characteristic data of the robot parts from the CD-ROM 17, creates characters corresponding to the robot toys 5, 7 on the basis of these data and outputs these characters to the monitor 9. As a result, the monitor 9 displays characters corresponding to the robot toys 5, 7.

Next, when players operate the various control switches of the controllers 11, 13, the control part 15 controls movements of the respective characters on the basis of information from the controllers 11, 13. For example, when a player operates the controller 13 of the robot toy 7 side to order an attack, a moving picture wherein the character corresponding to the robot toy 7 uses a weapon to make an attack is created and this movement of the character is displayed on the monitor 9. When on the other hand a player on the robot toy 5 side operates the controller 11 to order a rearward retreat, a moving picture wherein the character corresponding to the robot toy 5 retreats is created and this movement of the character is displayed on the monitor 9.

As fights between the two robot toys are repeated similarly thereafter, the control part 15 calculates the damage to each robot toy and when the vital power of one of the robot toys becomes zero deems that robot toy to be the loser. Also, fight data of the fight is recorded in the non-volatile memory provided in the body part of the winning robot toy, and the performance of that robot toy rises in level.

Next, assembly of an independently conceived robot toy will be described.

Figure 7:
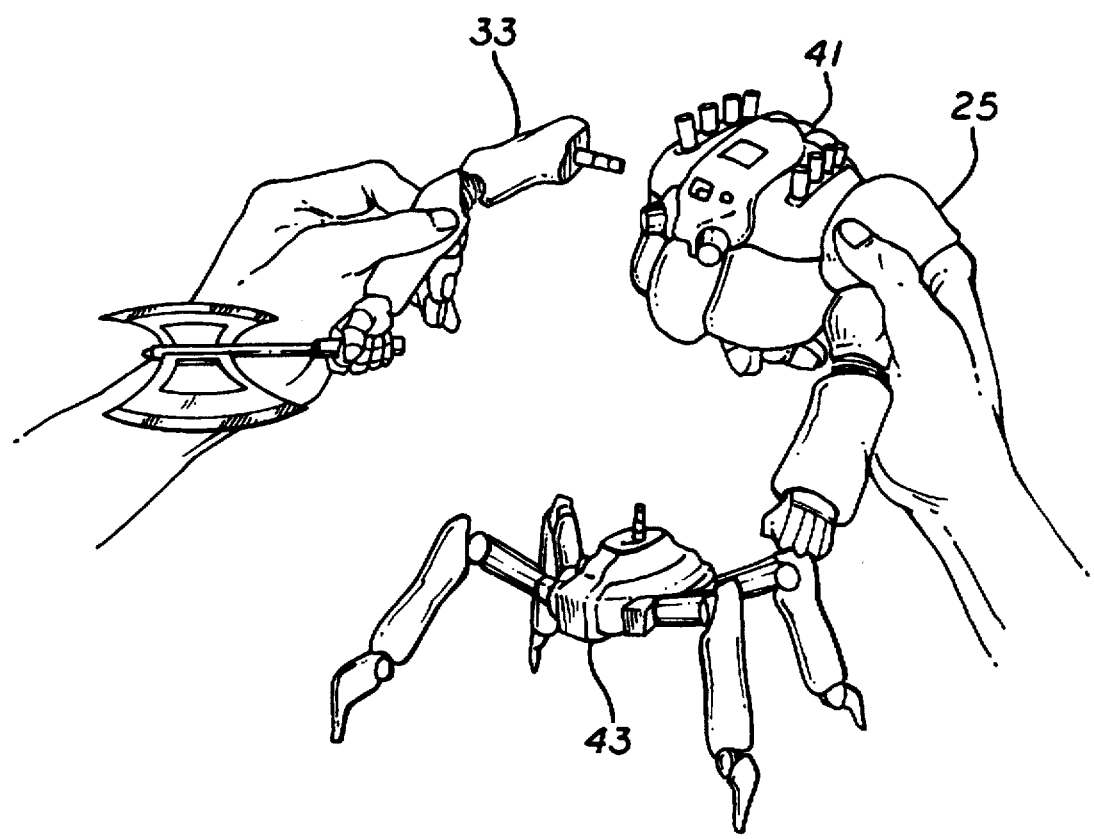
FIG. 7 is a view illustrating an independently conceived assembly of a robot toy used in the first preferred embodiment of the invention.

As shown in FIG. 7, to another kind of body, for example a body 41 of an imaginary creature, can be attached an arm part 33 having characteristics like those of an arm of the monster of the robot toy 7, an arm part 25 having characteristics like those of an arm of the gorilla of the robot toy 5 and a leg part 43 having characteristics like those of a crab which walks sideways on four legs.

As a result, the robot toy shown in FIG. 7 has the characteristics that it moves sideways using four legs, that its left arm is strong but moves slowly and that its right arm moves quickly but is relatively weak. A robot toy having these kinds of characteristic can be connected to the game main unit 3, a character corresponding to this robot toy can be displayed on the monitor 9 and a fighting game featuring this character can be played.

In the preferred embodiment described above, the body part 31 of the robot toy 7 was made as a principal robot part and the arm parts 33, 35 and the leg part 37 were shown as a plurality of types of robot part removably attached to this principal robot part; however, the invention is not limited to this and it is possible to use a principal robot part and robot parts in any suitable form. For example, it is possible to make the body part 31 as a principal robot part including the arm parts 33, 35 and the leg part 37 and use the various weapons 34, 38 and 39 as a plurality of kinds of robot part removably attached to this principal robot part.

In this case, preferably, identification parts for self-identification are provided in each of the weapons 34, 38 and 39 and these weapons 34, 38 and 39 are made mutually interchangeable.

Also, although in the preferred embodiment described above robot toys were used as the toy bodies removably connected to the game main unit 3, the invention is not limited to this and toy bodies of any suitable characters, for example animals and plants or monsters or the like, may alternatively be used.

Figure 8:
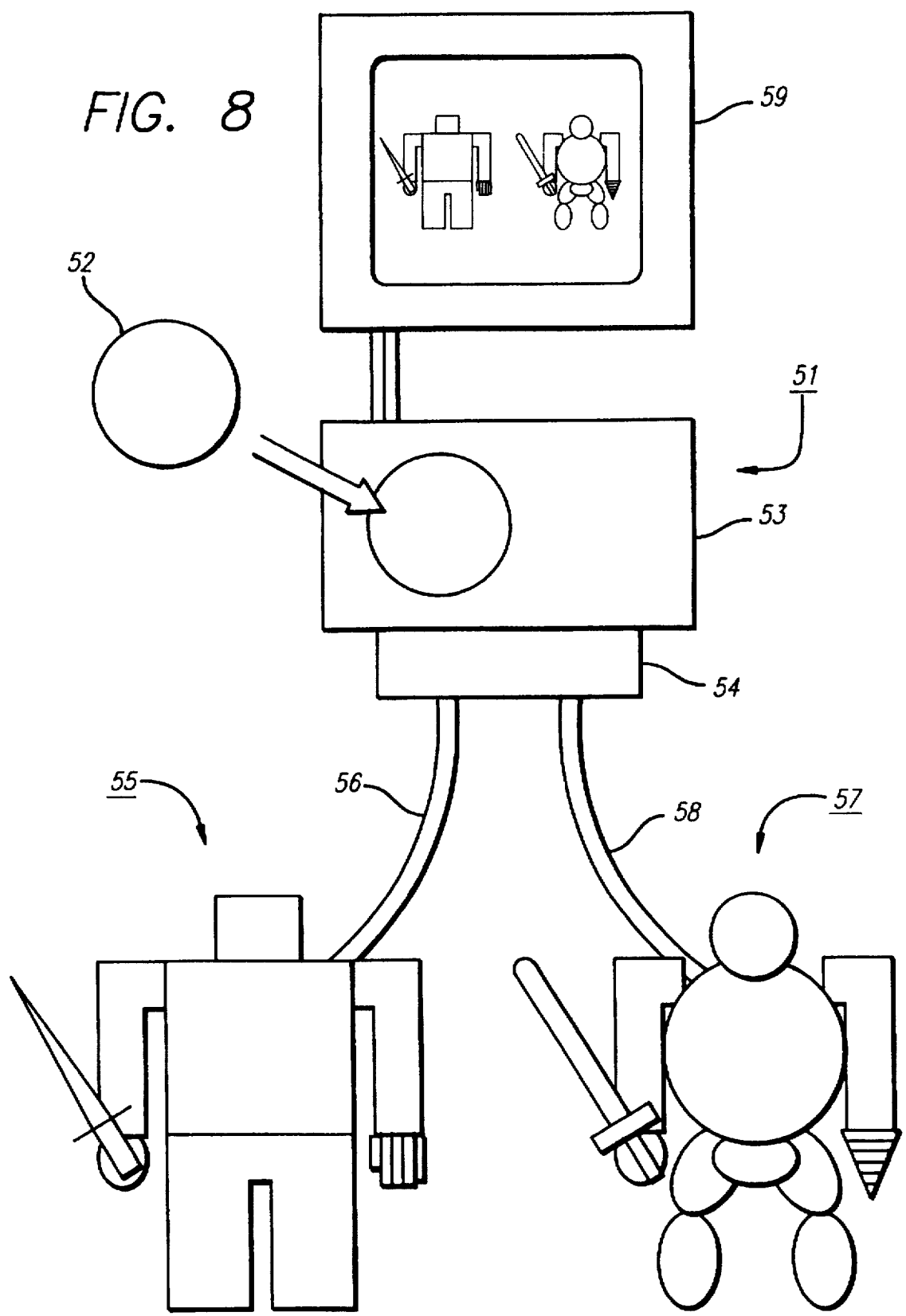
FIG. 8 is an overall construction view of a second preferred embodiment of the invention.

Next, the overall construction of a second preferred embodiment of the invention will be described with reference to FIG. 8.

A game apparatus 51 according to the invention has a game main unit 53, a CD-ROM 52 removably attached to the game main unit 53, a cartridge unit 54 removably attached to the game main unit 53, robot toys 55, 57 removably connected to the cartridge unit 54, a monitor 59 for displaying characters corresponding to the robot toys 55, 57 and controllers (not shown in the drawing) for controlling movements of the characters displayed on the monitor 59.

The cartridge unit 54 is connected by a cable 56 to a principal robot part of the robot toy 55 and by a cable 58 to a principal robot part of a robot toy 57. The game main unit 53 is connected by cables not shown in the drawing to the controllers and the game main unit 53 is also connected by a plurality of cables to the monitor 59.

Here, in the case of a so-called one-player game wherein a player plays a fighting game against a computer, only the robot toy connected on the cable 56 side is used. In the case of a fighting game between two players, the robot toy connected on the cable 56 side is assigned to one player and the robot toy connected on the cable 58 side is assigned to the other player.

Figure 9:
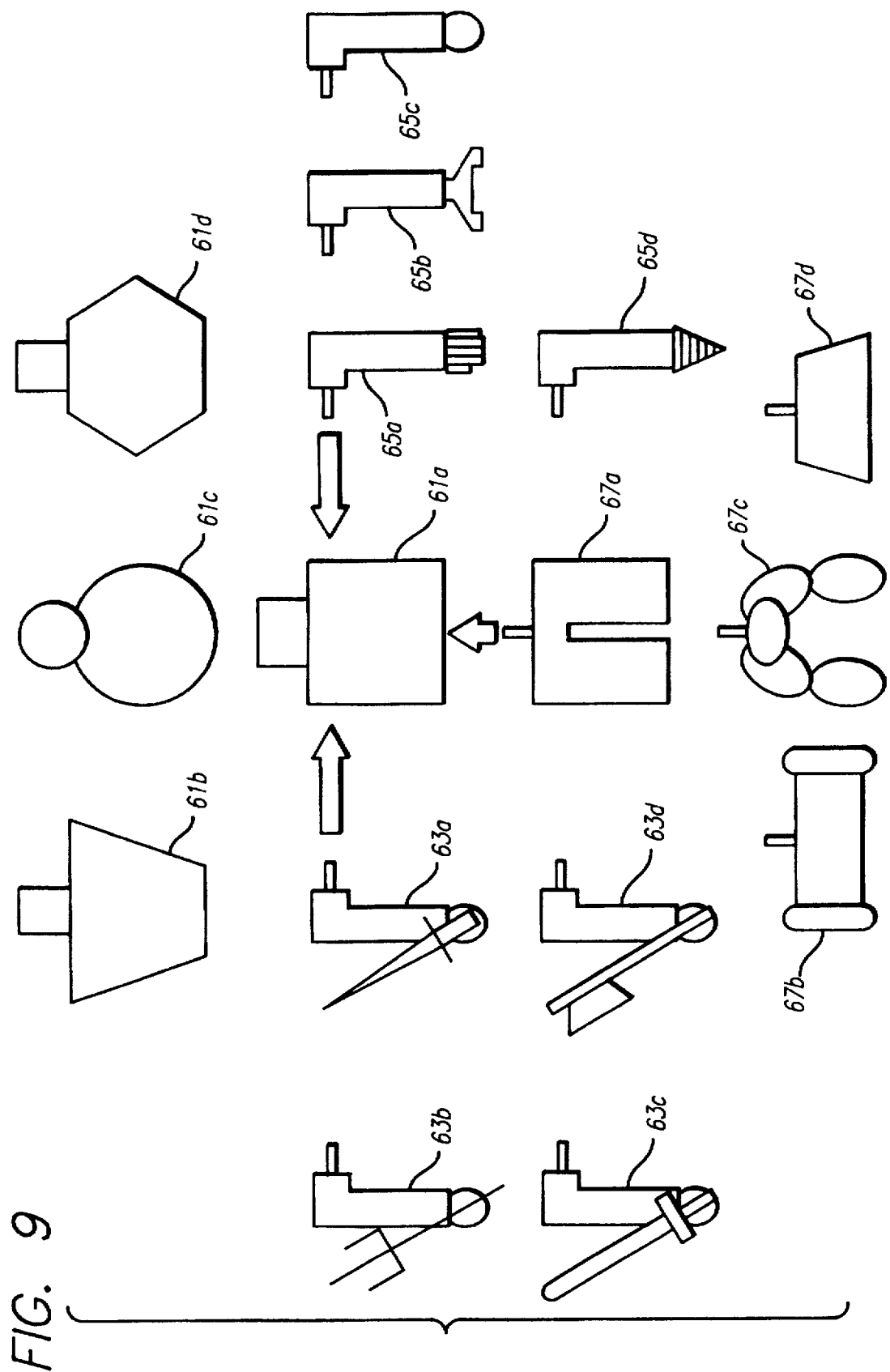
FIG. 9 is a view illustrating a robot toy used in the second preferred embodiment of the invention.

Next, a robot toy will be described with reference to FIG. 9.

A robot toy has four different principal robot parts 61a, 61b, 61c and 61d and robot parts removably attached to these principal robot parts 61a, 61b, 61c, 61d. These robot parts include four different left arm parts 63a, 63b, 63c and 63d, four different right arm parts 65a, 65b, 65c and 65d and four different leg parts 67a, 67b, 67c and 67d. A pin plug mutually interchangeable with other principal robot parts is provided on each of these arm parts and leg parts, pin jacks into which the pin plugs are plugged are provided in corresponding positions on the principal robot part and as a result any chosen robot part can be attached to any principal robot part. Therefore, by assembling chosen robot parts to any principal robot part, it is possible to assemble 256 (=4×4×4×4) different robot toys. For example, the robot toy 55 shown in FIG. 8 is made up of the principal robot part 61a, the left arm part 63a, the right arm part 65a and the leg part 67a. The robot toy 57 is made up of the principal robot part 61c, the left arm part 63c, the right arm part 65d and the leg part 67c.

The robot parts each have an identification part for identifying themselves. That is, each robot part has two bits of data for identification and internal connections have been made to its own pin plug terminals in advance according to this data for identification. The principal robot parts each have a non-volatile memory for storing self-related data and data on robot parts attached to them.

The CD-ROM 52 is a memory in which various software programs and data are stored. That is, software programs pertaining to fighting games for making characters corresponding to the robot toys appear in a game space and making these characters fight are stored in the CD-ROM 52. Also, data on the respective principal robot parts and the robot parts, for example data on external appearance and characteristic features, movement characteristics and weapons used, is stored in the CD-ROM 52. Communication software for conducting communication between the game main unit 53 and the cartridge unit 54 is also stored in the CD-ROM 52.

This communication software functions as information-gathering software for gathering information from the non-volatile memory; by data communication being carried out between the game main unit 53 and the cartridge unit 54 on the basis of this software, data such as the presence or absence of robot toys connected to the cartridge unit 54 and data on the principal robot parts and the robot parts constituting connected robot toys are sent to the game main unit. The game main unit 53 has data reading-in means for on the basis of the information gathered by the information-gathering software reading in corresponding data from the CD-ROM 52 and game-developing means for developing corresponding characters in a game space according to the data read in by the data reading-in means and manipulation of the controllers.

Next, the construction of a circuit part will be described with reference to FIG. 10.

The cartridge unit 54 is made up of an 8-bit CPU 71, a resetting IC 73, an oscillator 75, connectors 77, 78 and 79, capacitors C1–C4, resistors R1–R9, transistors Q1–Q3 and diodes D1–D3.

The CPU 71 determines the presence or absence of robot toys connected to the cartridge unit 54 by way of the connectors 77 and 78 and carries out control processing pertaining to gathering of data of the principal robot parts and the robot parts constituting connected robot toys. Also, by carrying out control processing pertaining to data communication between the game main unit 53 and the cartridge unit 54, the CPU 71 sends the gathered data to the game main unit 53.

The resetting IC 73 monitors a power supply voltage fed from the game main unit 53 and resets the CPU 71 when it detects a fluctuation or an abnormality of this power supply voltage.

The connectors 77, 78 and 79 are fixed to the cartridge unit 54. The cable 56 is led out from the connector 77 and has a pin jack 88 attached to its other end. A pin plug 89 onto which this pin jack 88 is fitted is fixed to the principal robot part. Similarly, a pin jack is attached to the end of the cable 58, which is led out from the connector 78, and a pin plug onto which this pin jack is fitted is fixed to the other principal robot part. The connector 79 is connected to the game main unit 53.

Next, the construction of the circuit parts of the four principal robot parts 61a, 61b, 61c and 61d will be described taking the principal robot part 61a as a representative example.

The principal robot part 61a has a 4-bit CPU 81, an EEPROM 82, a resetting IC 83, an oscillator 84, pin jacks with switch mechanisms 85, 86 and 87, capacitors C11–C14, resistors R11–R14, a transistor Q11, diodes D11 and D12 and jumper wires J1 and J2.

The CPU 81 determines the type of the principal robot part on the basis of the state of connection of the jumper wires J1 and J2, and for example when the jumper wires J1 and J2 are both connected determines that the type of the principal robot part is that of the principal robot part 61a. The CPU 81 also determines the presence or absence of robot parts connected to the principal robot part 61a, decodes the 2-bit data of robot parts connected to the principal robot part 61a and determines the types of those robot parts, and carries out control processing for reading in data of the robot parts to the EEPROM 82. The CPU 81 also carries out control processing pertaining to data communication with the cartridge unit 54.

The EEPROM 82 is a non-volatile memory, and fight results of games are stored therein as well as the various data mentioned above.

The resetting IC 83 monitors a power supply voltage supplied from the cartridge unit 54 and resets the CPU 81 when it detects a fluctuation or an abnormality of this power supply voltage.

The pin jacks with switch mechanisms 85, 86 and 87 are fixed to the principal robot part 61a, and a robot part is attached to each of these pin jacks with switch mechanisms 85, 86 and 87. That is, one of the four different leg parts 67a, 67b, 67c and 67d is attached to the pin jack 85, one of the four different right arm parts 65a, 65b, 65c and 65d is attached to the pin jack 86 and one of the four different left arm parts 63a, 63b, 63c and 63d is attached to the pin jack 87.

When robot parts are attached to the corresponding pin jacks 85, 86 and 87 in this way, the robot parts each output two bits of data for identification to the CPU 81.

The construction described above is the same in the other principal robot parts 61b, 61c and 61d also, and a detailed description of those will therefore be omitted.

Next, the operation of this second preferred embodiment of the invention will be explained.

A player can assemble an original robot toy by attaching chosen robot parts to any principal robot part. For example, when the left arm part 63a, the right arm part 65a and the leg part 67a are attached to the principal robot part 61a, the robot toy 55 is assembled. Similarly, when for example the left arm part 63c, the right arm part 65d and the leg part 67c are attached to the principal robot part 61c, the robot toy 57 is assembled.

When a fighting game is played between two players, the robot toy 55 assigned to one of the players is connected to the cable 56 and the robot toy 57 assigned to the other player is connected to the cable 58.

When a power supply switch on the game main unit 53 is turned on, power is supplied from the game main unit 53 to the cartridge unit 54, communication software is read out from the CD-ROM 52 and by data communication being carried out between the game main unit 53 and the cartridge unit 54 on the basis of this communication software data of the robot toys is gathered.

First, in the cartridge unit 54, by outputting a signal from a terminal P7 and thereby turning on the transistor Q1, the CPU 71 supplies power to the principal robot part 61a. Then, by communication being carried out at a rate of once a second between the CPU 71 and the CPU 81, the latest character information such as the presence or absence of connected robot toys and data on the principal robot parts and the robot parts constituting connected robot toys is gathered. Also, at the same time, this latest character information is stored in the EEPROM 82. When this communication between the CPU 71 and the CPU 81 finishes, the CPU 71 cuts off the power supply to the principal robot part 61a by turning off the transistor Q1. By carrying out communication between itself and the game main unit 53, the cartridge unit 54 sends the latest character information to the game main unit 53. At this time, the kind of data consisting of an upper rank one byte and a lower rank one byte shown in FIG. 11 is sent. The data of each byte consists of eight bits; the 1st bit of the upper rank byte indicates the presence or absence of a connected left arm part, the 2nd bit indicates the presence or absence of a connected right arm part and the 3rd bit indicates the presence or absence of a connected leg part. The 0th and 1st bits of the lower rank byte indicate the type of the left arm part, the 2nd and 3rd bits indicate the type of the right arm part, the 4th and 5th bits indicate the type of the leg part and the 6th and 7th bits indicate the type of the principal robot part.

Accordingly, the game main unit 53 can gather the latest character information by receiving the data shown in FIG. 11.

The gathering of the latest character information described above is the same in the case of the robot toy 57 also, and a detailed description of that will therefore be omitted.

Next, on the basis of the above-mentioned gathered latest character information the game main unit 53 reads in corresponding data from the CD-ROM 52 and according to this read-in data and the manipulation of the controllers develops corresponding characters in a game space and proceeds with a fighting game between the robot toy 55 and the robot toy 57. A moving picture of this fight is displayed on the monitor 59.

As described above, according to the first means provided by the invention, because it is possible to control a game with a toy body placed nearby and it is made easy for players to empathize with the fighting characters, there is the effect that it is possible to make the game more interesting.

Also, a character corresponding to a toy body connected to a game main unit is displayed on a monitor and movements of this character are controlled by means of a controller. The toy body has a principal toy body part and a plurality of different toy body parts removably attached to the principal toy body part, the principal toy body part has a non-volatile memory in which self-related data is stored and each of the toy body parts has an identification part for identifying itself Also, the game main unit has reading-out means for reading out data from the non-volatile memory of the principal toy body part and specifying means for decoding the identification part of each of the toy body parts and individually specifying the toy body parts and has controlling means for controlling movements of the character according to data read out by the reading-out means, details specified by the specifying means and manipulation of the controller, and as a result there is the effect that it is possible to combine a three-dimensional toy body and a game machine and display a character corresponding to the toy body on a monitor and freely control it, and thereby realize a highly interesting game apparatus.

In the second means provided by the invention, characters corresponding to at least a pair of toy bodies connected to a game main unit are displayed on a monitor and movements of each of these displayed characters are controlled by means of respective controllers.

Each of the toy bodies has a principal toy body part and toy body parts removably attached to the principal toy body part, each of the principal toy body parts has a non-volatile memory in which self-related data is stored and each of the principal toy body parts has at least toy body parts constituting arm parts and leg parts and the arm parts and the leg parts are each mutually interchangeable with those of other principal toy body parts, and as a result there is the effect that it is possible to easily assemble an independently conceived toy body.

Also, each of the toy body parts has an identification part for identifying itself and the game main unit has reading-out means for reading out data from the non-volatile memory of each of the principal toy body parts and specifying means for decoding the identification part of each of the toy body parts and individually specifying the toy body parts attached to each of the principal toy body parts. The game main unit has controlling means for controlling movements of the characters displayed on the monitor according to data read out by the reading-out means, details specified by the specifying means and manipulation of the controllers and has a memory in which is stored fighting game software for making characters corresponding to the toy bodies appear in a game space and game-developing means for developing the characters in the fighting game according to the control of the controlling means, and as a result there is the effect that it is possible to combine three-dimensional toy bodies and a game machine and make characters corresponding to the toy bodies fight each other on a monitor, and it is possible to provide a highly entertaining game apparatus with which play can be given a sense of satisfaction and interest.

According to the third means provided by the invention, their are provided a memory removably loaded in a game main unit, a cartridge unit removably connected to the game main unit and a toy body removably connected to the cartridge unit. Game software in which appears a character corresponding to the toy body is stored in the memory. The toy body has a principal toy body part and toy body parts removably attached to the principal toy body part. The toy body parts have identification parts for identifying themselves and include at least a plurality of arm parts and a plurality of leg parts and the plurality of arm parts and the plurality of leg parts are each mutually interchangeable with those of other principal toy body parts. The principal toy body part has a non-volatile memory for storing self-related data and data of toy body parts attached to itself. This non-volatile memory is gathered by a cartridge unit and the gathered data is sent to the game main unit by communicating means. A game wherein a corresponding character appears is developed according to this gathered data, and as a result there is the effect that it is possible to combine three-dimensional toy bodies and a game machine and make characters corresponding to the toy bodies fight each other, and it is possible to provide a highly entertaining game apparatus with which play can be given a sense of satisfaction and interest.

According to the fourth means provided by the invention, there is provided a game main unit, a memory removably loaded in the game main unit, a cartridge unit removably connected to the game main unit, a toy body removably connected to the cartridge unit, a monitor for displaying a character corresponding to the toy body and a controller for controlling movements of the character displayed on the monitor. The toy body has a principal toy body part and toy body parts removably attached to the principal toy body part, the toy body parts include at least a plurality of arm parts and a plurality of leg parts and the plurality of arm parts and the plurality of leg parts are each mutually interchangeable with those of other principal toy body parts and each of the toy body parts has an identification part for identifying itself Also, the principal toy body part has a non-volatile memory for storing self-related data and data of toy body parts attached to itself. The memory stores game software in which appears a character corresponding to the toy body and individual data of the principal toy body part and the toy body parts constituting the toy body, and stores information-gathering software for gathering information from the non-volatile memory. The game main unit has data reading-in means for on the basis of information gathered by the information-gathering software reading in corresponding data from the memory and game-developing means for according to the data read in by the data reading-in means and manipulation of the controller developing the character in a game space, and as a result there is the effect that it is possible to combine three-dimensional toy bodies and a game machine and make characters corresponding to the toy bodies fight each other, and it is possible to provide a highly entertaining game apparatus with which play can be given a sense of satisfaction and interest. Thus, it is seen that a game apparatus is provided. One skilled in the art will appreciate that the present invention can be practiced by other than the preferred embodiments which are presented for purpose of illustration, and not of limtation, and the present invention is limited only by the claims which follow.

What is claimed is:

1. A game apparatus comprising:
   (a) a game main unit, a toy body connected to the game main unit, a monitor for displaying a character corresponding to the toy body and a controller for controlling movements of the character displayed on the monitor;
   (b) the toy body having a principal toy body part and a plurality of toy body parts removably attached to the principal toy body part;
   (c) the principal toy body part having a non-volatile memory for storing self-related data;
   (d) each of the toy body parts having an identification part for identifying itself;
   (e) the game main unit having reading-out means for reading out data from the non-volatile memory of the principal toy body part and specifying means for decoding the identification part of each of the toy body parts and individually specifying the toy body parts; and
   (f) the game main unit having controlling means for controlling the character displayed on the monitor according to data read out by the reading-out means, details specified by the specifying means and manipulation of the controller.

2. A game apparatus comprising:
   (a) a game main unit, at least a pair of toy bodies connected to the game main unit, a monitor for displaying characters corresponding to the toy bodies and controllers for controlling movements of the characters displayed on the monitor;
   (b) each of the toy bodies having a principal toy body part and toy body parts removably attached to the principal toy body part;
   (c) each of the principal toy body parts having a non-volatile memory in which self-related data is stored;
   (d) the toy body parts including at least a plurality of arm parts and a plurality of leg parts wherein the plurality of arm parts and the plurality of leg parts are each mutually interchangeable with those of other principal toy body parts;
   (e) each of the toy body parts having an identification part for identifying itself;
   (f) the game main unit having reading-out means for reading out data from the non-volatile memory of each of the principal toy body parts and specifying means for decoding the identification part of each of the toy body parts and individually specifying the toy body parts attached to each of the principal toy body parts;
   (g) the game main unit having controlling means for controlling the characters displayed on the monitor according to data read out by the reading-out means, details specified by the specifying means and manipulation of the controllers; and
   (h) the game main unit having a memory in which is stored fighting game software for making characters corresponding to the toy bodies appear in a game space and game-developing means for developing the characters in the game space according to the control of the controlling means.

3. A game apparatus comprising:
   (a) a memory removably loaded in a game main unit, a cartridge unit removably connected to the game main unit and a toy body removably connected to the cartridge unit;
   (b) game software stored in the memory, wherein the game software includes instructions for generating and controlling a character corresponding to the toy body;
   (c) the toy body having a principal toy body part and toy body parts removably attached to the principal toy body part;
   (d) the toy body parts including at least a plurality of arm parts and a plurality of leg parts wherein the plurality of arm parts and the plurality of leg parts are each mutually interchangeable with those of other principal toy body parts;
   (e) each of the toy body parts having an identification part for identifying itself;
   (f) the principal toy body part having a non-volatile memory for storing self-related data and data of toy body parts attached to itself; and
   (g) the cartridge unit having communicating means for gathering data from the non-volatile memory and transferring the gathered data to the game main unit.

4. A game apparatus comprising:
   (a) a game main unit, a memory removably loaded in the game main unit, a cartridge unit removably connected to the game main unit, a toy body removably connected to the cartridge unit, a monitor for displaying a character corresponding to the toy body and a controller for controlling movements of the character displayed on the monitor;
   (b) the toy body having a principal toy body part and toy body parts removably attached to the principal toy body part;
   (c) the toy body parts including at least a plurality of arm parts and a plurality of leg parts wherein the plurality of arm parts and the plurality of leg parts are each mutually interchangeable with those of other principal toy body parts;
   (d) each of the toy body parts having an identification part for identifying itself;
   (e) the principal toy body part having a non-volatile memory for storing self-related data and data of toy body parts attached to itself;
   (f) the memory storing game software in which appears a character corresponding to the toy body and individual data of the principal toy body part and the toy body parts constituting the toy body;

(g) the memory storing information-gathering software for gathering information from the non-volatile memory; and (h) the game main unit having data reading-in means for on the basis of information gathered by the information-gathering software reading in corresponding data from the memory and game-developing means for according to the data read in by the data reading-in means and manipulation of the controller developing the character in a game space of the game software.

* * * * *